US008345278B2

(12) United States Patent
Iizuka

(10) Patent No.: US 8,345,278 B2
(45) Date of Patent: Jan. 1, 2013

(54) JOB PROCESSING SYSTEM, JOB PROCESSING APPARATUS, AND CONTROL METHOD THEREOF

(75) Inventor: Hiroko Iizuka, Hachioji (JP)

(73) Assignee: Canon Kabushiki Kaisha, Tokyo (JP)

(*) Notice: Subject to any disclaimer, the term of this patent is extended or adjusted under 35 U.S.C. 154(b) by 315 days.

(21) Appl. No.: 12/629,711

(22) Filed: Dec. 2, 2009

(65) Prior Publication Data
US 2010/0149580 A1    Jun. 17, 2010

(30) Foreign Application Priority Data

Dec. 11, 2008  (JP) ................................ 2008-316272

(51) Int. Cl.
*G06F 3/12* (2006.01)
(52) U.S. Cl. ........ 358/1.14; 358/1.15; 358/1.3; 358/1.1; 713/160; 713/168
(58) Field of Classification Search ............... 358/1.14, 358/1.15, 1.3, 1.6, 1.1, 1.16; 713/160, 168; 719/321
See application file for complete search history.

(56) References Cited

U.S. PATENT DOCUMENTS

| | | | |
|---|---|---|---|
| 7,130,852 B2* | 10/2006 | Parent | 1/1 |
| 7,269,727 B1* | 9/2007 | Mukherjee et al. | 713/160 |
| 7,382,487 B2* | 6/2008 | Ikegami | 358/1.6 |
| 7,701,599 B2* | 4/2010 | Kumashio | 358/1.15 |
| 7,715,030 B2* | 5/2010 | Higashiura et al. | 358/1.14 |
| 7,872,771 B2* | 1/2011 | Kojima et al. | 358/1.15 |
| 7,978,354 B2* | 7/2011 | Uchikawa | 358/1.14 |
| 8,023,139 B2* | 9/2011 | Sakai | 358/1.15 |
| 2002/0097431 A1 | 7/2002 | Ikegami | |
| 2003/0151760 A1* | 8/2003 | Berndt et al. | 358/1.14 |
| 2006/0082805 A1* | 4/2006 | Kobayashi et al. | 358/1.14 |
| 2006/0192999 A1* | 8/2006 | Kawai | 358/1.15 |
| 2006/0268306 A1* | 11/2006 | Kojima et al. | 358/1.13 |
| 2007/0038859 A1* | 2/2007 | Tadayon et al. | 713/168 |
| 2007/0052980 A1* | 3/2007 | Lee | 358/1.1 |

(Continued)

FOREIGN PATENT DOCUMENTS

EP    1193593 A    4/2002

(Continued)

OTHER PUBLICATIONS

European Search Report dated Apr. 29, 2010 concerning the corresponding European Patent Application No. 09178709.3.

(Continued)

*Primary Examiner* — Charlotte M Baker
*Assistant Examiner* — Ashish K Thomas
(74) *Attorney, Agent, or Firm* — Fitzpatrick, Cella, Harper & Scinto

(57) ABSTRACT

In a job processing system, usage restriction information is managed for restricting user usage of functions of a job processing apparatus. An information processing apparatus acquires usage restriction information corresponding to a first operator instructing generation of job data, and writes the usage restriction information into job data to be transmitted to the job processing apparatus. The job processing apparatus checks whether or not the usage restriction information is written in the job data received from the information processing apparatus, and when the usage restriction information is confirmed, processes the job data in accordance with the usage restriction information, and when the usage restriction information is not confirmed, processes the job data in accordance with usage restriction information of a second operator instructing execution of a job in the job processing apparatus.

9 Claims, 11 Drawing Sheets

U.S. PATENT DOCUMENTS

| | | |
|---|---|---|
| 2007/0253014 A1 | 11/2007 | Nakata |
| 2007/0279671 A1 | 12/2007 | Shouno |
| 2007/0297014 A1* | 12/2007 | Kuga et al. .................. 358/3.28 |
| 2008/0007760 A1* | 1/2008 | Kimura ........................ 358/1.14 |
| 2008/0204807 A1* | 8/2008 | Nakatsuka .................. 358/1.16 |
| 2009/0021779 A1* | 1/2009 | Hagiwara .................... 358/1.15 |
| 2009/0051955 A1* | 2/2009 | Mihara ........................ 358/1.13 |
| 2009/0089811 A1* | 4/2009 | Ferlitsch ....................... 719/321 |
| 2011/0128584 A1* | 6/2011 | Kuroshima .................. 358/1.15 |

FOREIGN PATENT DOCUMENTS

| | | |
|---|---|---|
| EP | 1335276 A | 8/2003 |
| JP | 2003-150336 A | 5/2003 |

OTHER PUBLICATIONS

European Office Action dated Oct. 4, 2012 issued in corresponding European Patent Application No. 09178709.3.

* cited by examiner

F I G. 6C
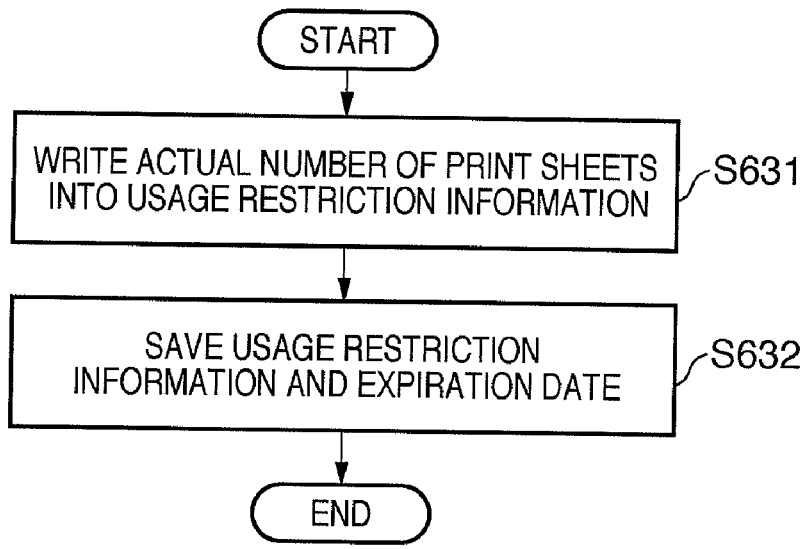
F I G. 6D
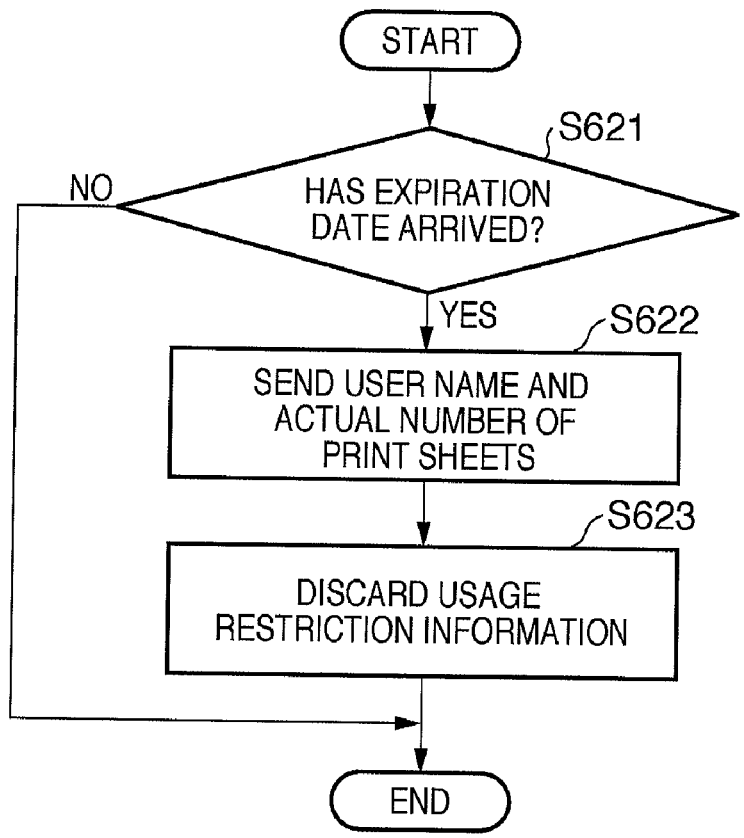

F I G. 8

| 801a | 801b | 801c | 801d | 801e | 801f | 801g | 801i |
|------|------|------|------|------|------|------|------|
| 801  | 802  |      |      |      |      |      |      |

```xml
<?xml version="1.0" encoding="UTF-8"?>
<ACT xmlns:xsi="http://www.w3.org/2001/XMLSchema-instance">
  <Version>0</Version>
  <UserInfo>
    <UserName> Taro</UserName>
    <BaseRole> PowerUser </BaseRole>
    <UserEmail> taro@xxx.yyy </UserEmail>
  </UserInfo>
  <DeviceInfo>
    <PrintSecurityLevel>0</PrintSecurityLevel>
  </DeviceInfo>
  <DeviceAccessControl>
    <AttributeCategoryName="DeviceCapabilityRestriction"CategoryStatus="Static"
      <saml:AttributeStatement>
        <saml:AttributeName="PdlPrint">
          <saml:AttributeValueName="PdlPrintFlag">Permit</saml:AttributeValue>
          <saml:AttributeValueName="ColorPrint">Color</saml:AttributeValue>
          <saml:AttributeValueName="Simplex">Deny</saml:AttributeValue>
        </saml:Attribute>
      </saml:AttributeStatement>
    </AttributeCategory>
    <AttributeCategoryName="QuotaRestriction"CategoryStatus="Dynamic"
      <saml:AttributeStatement>
        <saml:AttributeName="Print">
          <saml:AttributeValueName="ColorPrintTotal">1000</saml:AttributeValue>
          <saml:AttributeValueName="BwPrintTotal">1000</saml:AttributeValue>
        </saml:Attribute>
      </saml:AttributeStatement>
    </AttributeCategory>
  </DeviceAccessControl>
</ACT>
```

FIG. 9

| USER NAME | COLOR PRINT CAPABILITY FLAG | SINGLE-SIDED PRINT CAPABILITY FLAG | N-UP PRINT INFORMATION | UPPER-LIMIT NUMBER OF PRINT SHEETS | LOCKED NUMBER OF PRINT SHEETS AT THE UPPER-LIMIT NUMBER |
|---|---|---|---|---|---|
| USER X | OK | OK | 1up | 100 | 10 |
| USER Y | NG | NG | 2up | 100 | 0 |
| ... | ... | ... | ... | ... | ... |

JOB PROCESSING SYSTEM, JOB PROCESSING APPARATUS, AND CONTROL METHOD THEREOF

BACKGROUND OF THE INVENTION

1. Field of the Invention

The present invention relates to a job processing system, a job processing apparatus, and a control method thereof. In particular, it relates to a job processing system, a job processing apparatus, and a control method thereof that are capable of temporarily reducing restriction of usage of functions for specific job data in a job processing system that restricts usage of functions of a job processing apparatus.

2. Description of the Related Art

As one part of improving security for networked devices in recent years, increasing importance has been attached to restricting functions in print jobs, and various measures have been implemented. For example, technologies are known such as in Japanese Patent Laid-Open No. 2003-150336 in which a print permit (ticket) authorized by a server is obtained when a user generates a print job, and this is sent with the print job to an image forming apparatus. This ticket describes which functions can be used by the user who input the job to the image forming apparatus, and the image forming apparatus is capable of flexibly carrying out restrictions on print job execution in accordance with the ticket.

However, conventional technologies such as Japanese Patent Laid-Open No. 2003-150336 presuppose that a ticket is obtained of the user who carried out print job generation processing each time a print job is generated and that the print job and the ticket are sent together to the image forming apparatus. Thus, print output processing is executed in the image forming apparatus always in accordance with the ticket in which is described the usage restriction information of the user who carried out print job generation processing, and therefore there is a problem that temporarily reducing restriction of usage for specific job data cannot be achieved even if this is desired.

This problem is not particularly limited to documents in image forming apparatuses, but is a problem that is inevitably encountered in various systems in cases where usage restriction of users is executed.

SUMMARY OF THE INVENTION

The present invention has been devised to address the foregoing issues and provides a system that is capable of temporarily reducing restriction of usage for specific job data in an image forming system that is executing usage restriction of users.

To solve the above problems, the present invention provides a job processing system including a job processing apparatus for executing a job, and an information processing apparatus having a job data generation function and capable of communicating with the job processing apparatus, which are connected to a network. The system comprises: a management unit configured to manage usage restriction information to restrict user usage of functions in the job processing apparatus; a writing unit in the information processing apparatus, configured to acquire from the management unit usage restriction information corresponding to a first operator instructing generation of job data using the job data generation function, and writing, by the job data generation function, the acquired usage restriction information into the job data to be transmitted to the job processing apparatus; a checking unit in the job processing apparatus, configured to check whether or not the usage restriction information is written in the job data received from the information processing apparatus; and a job processing unit in the job processing apparatus, configured to process the job data in accordance with the written usage restriction information when the checking unit recognizes that the usage restriction information is written in the job data, and when the checking unit can not recognize that the usage restriction information is written in the job data, to acquire from the management unit usage restriction information of a second operator instructing execution of a job based on job data in the job processing apparatus, and process the job data in accordance with the acquired usage restriction information.

The present invention provides a job processing apparatus in a job processing system including the job processing apparatus for executing a job, and an information processing apparatus having a job data generation function and capable of communicating with the job processing apparatus, which are connected to a network. The job processing apparatus comprises: a checking unit configured to check whether or not usage restriction information corresponding to a first operator instructing generation of job data using the job data generation function is written in the job data received from the information processing apparatus; and a job processing unit configured to process the job data in accordance with the written usage restriction information when the checking unit recognizes that the usage restriction information is written in the job data, and when the checking unit can not recognize that the usage restriction information is written in the job data, to acquire usage restriction information of a second operator instructing execution of a job based on job data in the job processing apparatus from a management unit that manages usage restriction information for restricting usage of functions of the job processing apparatus for each user, and process the job data in accordance with the acquired usage restriction information.

The present invention also provides a method of controlling a job processing apparatus in a job processing system comprising the job processing apparatus for executing a job, and an information processing apparatus having a job data generation function and capable of communicating with the job processing apparatus, which are connected to a network. The method comprises the steps of: checking whether or not usage restriction information corresponding to a first operator who has instructed generation of job data using the job data generation function is written in the job data received from the information processing apparatus; processing the job data in accordance with the written usage restriction information when it is recognized in the checking step that the usage restriction information is written in the job data; and acquiring usage restriction information of a second operator instructing execution of a job based on job data in the job processing apparatus from a management unit that manages usage restriction information for restricting usage of functions of the job processing apparatus for each user, and processing the job data in accordance with the acquired usage restriction information, when it is not recognized in the checking step that the usage restriction information is written in the job data.

The present invention further provides a computer-readable storage medium which stores a program for causing a computer to execute steps of the above mentioned method of controlling a job processing apparatus.

With the present invention, a system can be provided that temporarily reduces restriction of usage for specific job data in a job processing system that is executing usage restriction of users.

Further features of the present invention will become apparent from the following description of exemplary embodiments with reference to the attached drawings.

BRIEF DESCRIPTION OF THE DRAWINGS

FIG. 6C is a flowchart showing one example of processing after a print output operation of the image forming apparatus.

FIG. 6D is a flowchart showing one example of processing after expiration date of the image forming apparatus.

FIG. 8 is a diagram showing one example of print data according to the present embodiment.

FIG. 9 is a diagram showing one example of a database storing usage restriction information in the user information management apparatus.

DESCRIPTION OF THE EMBODIMENTS

Hereinafter, illustrative and detailed description is given of preferred embodiments of the present invention with reference to the accompanying drawings. Note that the image forming system and configuration elements thereof described in the embodiments are merely illustrative examples, and the scope of the present invention is not intended to be limited by these. That is, the present invention is not only for problems particularly limited to documents in image forming apparatuses in image forming systems, but can also be applied to job processing systems in various systems in which usage restriction of users is executed using jobs and tickets, and equivalent effects are achieved. These are also included in the present invention. Furthermore, the present invention is applicable to the processing of various jobs other than jobs relating to image forming.

Figure 1:
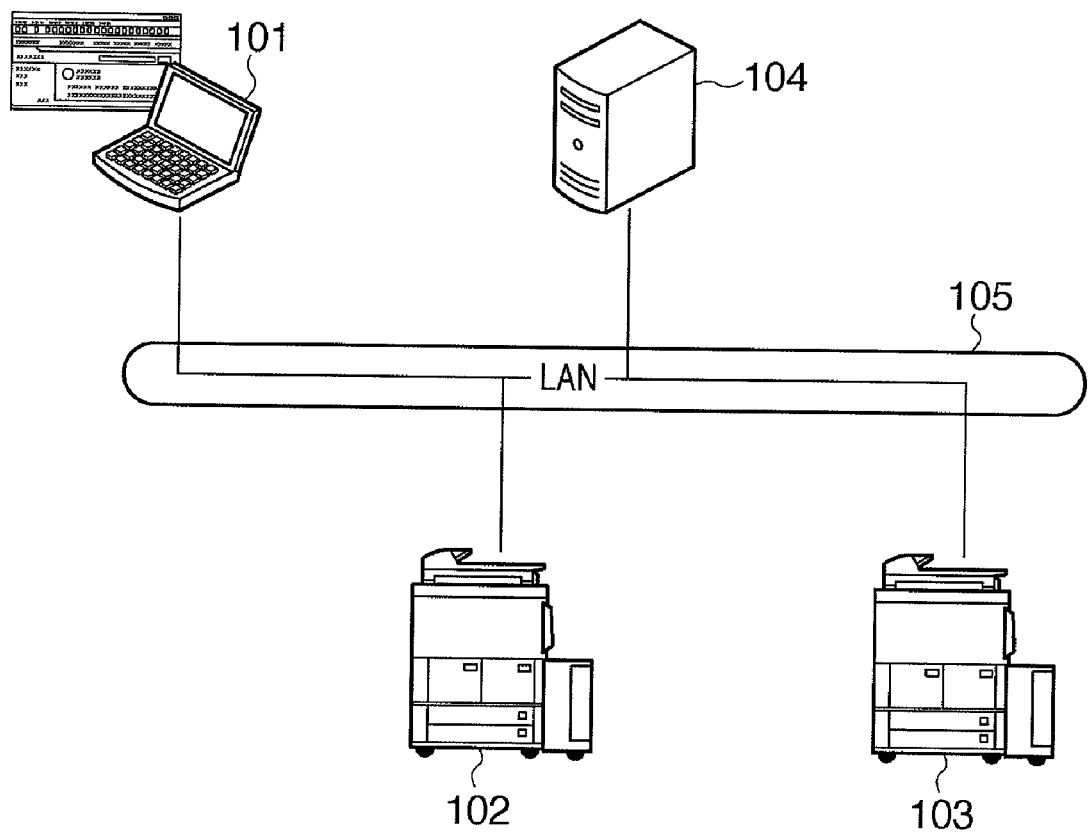
FIG. 1 is a diagram showing one example of an overall configuration of an image forming system according to the present embodiment.

Overall Configuration Example of Image Forming System According to Present Embodiment FIG. 1 is a diagram showing an overall configuration example of an image forming system, which is one example of a job processing system according to embodiments hereinafter.

In FIG. 1, numeral 101 is a client computer (hereinafter abbreviated to client PC). The client PC in the present embodiment is at least provided with a printer driver having a function for generating print data and outputting the print data externally, a printer server that manages print data to be sent to a printer, and an application or a Web browser or the like that prepares data for printing. However, functions provided by the client PC are not limited to these and it is not necessary for all of these to be provided. Numerals 102 and 103 indicate image forming apparatuses. Here, the image forming apparatuses 102 and 103 are digital multifunction peripherals (MFP). That is, in addition to a function for copying originals, they are provided with functions such as a function (SEND function) for sending image data via a network to an external file server or an email address, and a print output function for processing each type of input job and carrying out recording to a print medium.

Numeral 104 indicates a user information management apparatus. The user information management apparatus 104 is provided with a database for managing usage restriction information for each user in regard to various functions of the image forming apparatuses 102 and 103. And it provides usage restriction information relating to a user requested at arbitrary timings by the image forming apparatuses 102 or 103 or the client PC 101. It should be noted that the usage restriction information managed by the user information management apparatus 104 includes information of a number of print sheets for each user as usage restriction information with respect to the various functions of the image forming apparatuses 102 and 103. Furthermore, configurations are possible in which the usage restriction information held by the user information management apparatus 104 is held by the image forming apparatuses or the client PC.

The above-mentioned apparatuses are connected via a LAN (local area network) 105 and are capable of data communications with each other.

It should be noted that the terms client PC and user information management apparatus in the present embodiment are common names for the purpose of description, and are in fact apparatuses that can be constructed using ordinary general-purpose information processing apparatuses. Furthermore, a LAN is used in the following description as an example of a communication medium that intercedes between the various apparatuses, but there is no limitation to this. For example, an embodiment can be applied in which the various apparatuses are connected via a local interface such as the following. This includes an Internet communication network, a WAN (wide area network) constructed from multiple LANs, a wireless LAN in accordance with a standard such as IEEE 802.11b, IEEE 1284, or USB (universal serial bus).

Figure 2:
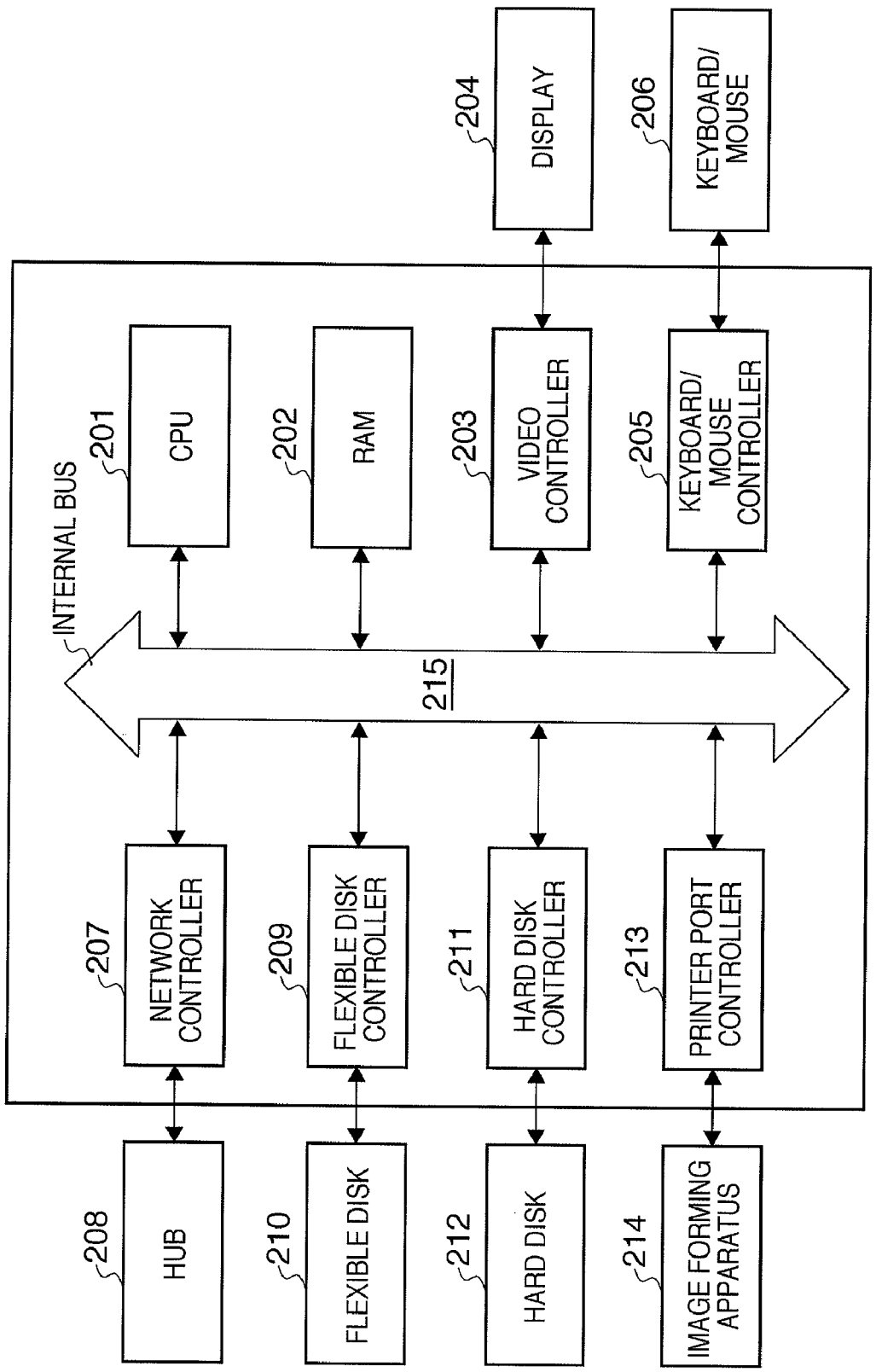
FIG. 2 is a block diagram showing one example of a hardware configuration of an information processing apparatus according to the present embodiment.

Block Diagram of Hardware of Information Processing Apparatus According to Present Embodiment FIG. 2 is a block diagram showing one example of a hardware configuration of an information processing apparatus (such as the client PC 101 and the user information management apparatus 104) that realizes the present embodiment.

A CPU 201 executes programs that are stored in a RAM 202 or the like. Furthermore, the CPU 201 loads into the RAM 202 programs and data and the like that are saved in a flexible disk (FD) 210 or a hard disk (HD) 212 as a nonvolatile storage unit, and saves content of the RAM 202 in the FD 210 or the HD 212.

A flexible disk controller 209 and a hard disk controller 211 carry out data reading from and data writing to storage media. A video controller 203 outputs drawing information to a connected display 204. A keyboard/mouse 206 is an input device for inputting various data. Input from such a device is processed by programs that are run by the CPU 201 by way of a keyboard/mouse controller 205.

A network controller 207 connects to the LAN 105 of FIG. 1 via a hub 208 and carries out communications with apparatuses on the network. Furthermore, due to control of a printer port controller 213, it is also possible to carry out direct communication with an image forming apparatus 214 connected to a printer port. Here, the image forming apparatus 214 may be the image forming apparatus 102 or 103 shown in FIG. 1. The CPU 201, the RAM 202, and each of the controllers are connected to an internal bus 215 and carry out exchanges of control information and data.

In the image forming system according to the present embodiment, the client PC 101 has a print data generation function as an information processing apparatus of generating print data from file data received from image forming apparatuses. It should be noted that in a case where it is extended as a job processing system, the client PC 101 has a job data generation function as an information processing apparatus.

It should be noted that the foregoing description of FIG. 2 described the client PC 101 as an example, but in the user information management apparatus 104 according to the present embodiment, a further database is provided in which usage restriction information is stored in the flexible disk 210 or the hard disk 212.

Example Configuration of Database of User Information Management Apparatus

FIG. 9 shows one example of a database storing the above-mentioned usage restriction information in the user information management apparatus 104.

In the example of FIG. 9, the following five sets of usage restriction information are stored corresponding to a user name 901. First, there is a color print capability flag 902 for whether or not each user is permitted to perform color printing. Next, there is a single-sided print capability flag 903 for whether or not each user is permitted to perform single-sided printing. In regard to the color print capability flag 902 and the single-sided print capability flag 903, "OK" indicates permitted and "NG" indicates not permitted.

N-up print information 904 is information that indicates data of N pages to be reduced for printing on a single sheet in regard to the printing of each user. An upper-limit number 905 of print sheets is information indicating an upper limit number of sheets that can be printed by each user within an effective period used in the usage restriction information.

A locked number 906 of print sheets at the upper-limit number is information indicating a number of sheets that can be printed in a case where a number of print sheets specified as a number of print sheets that can be printed by the user is temporarily locked from the upper-limit number of print sheets due to a temporary subtraction process, which is described later.

Figure 3:
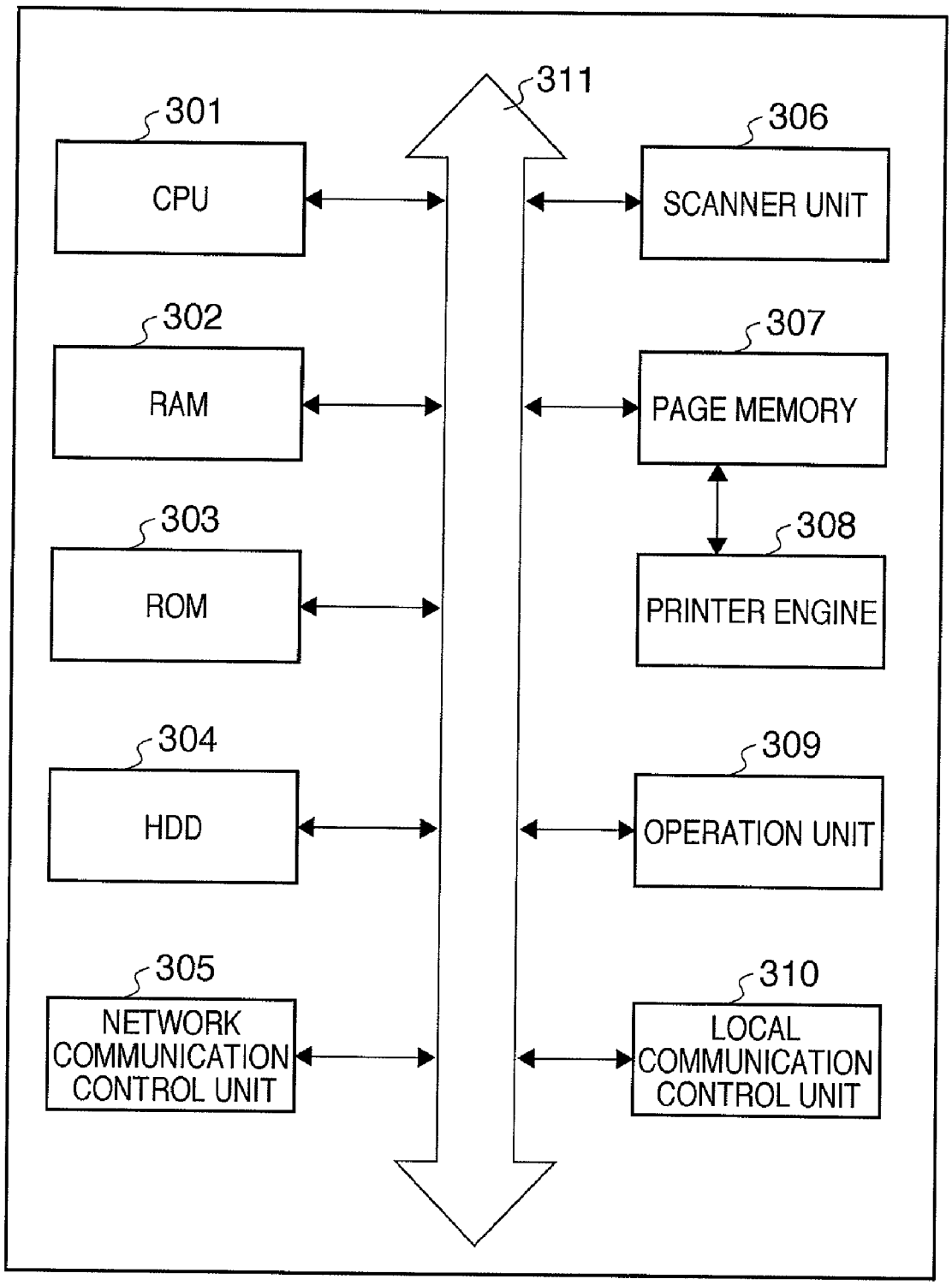
FIG. 3 is a block diagram showing one example of a hardware configuration of an image forming apparatus according to the present embodiment.

Block Diagram of Hardware of Image Forming Apparatus According to Present Embodiment FIG. 3 is a block diagram showing one example of a hardware configuration of an image forming apparatus according to the present embodiment.

A CPU 301 of the image forming apparatus comprehensively controls access to each of the devices connected to a system bus 311 in accordance with a control program or the like stored in a ROM 303 or a HDD (hard disk) 304. Furthermore, it develops page description language received from outside into image data that is printable by a printer engine. And it administers a function of outputting image signals as output information to a page memory 307 that is connected via an unshown video I/F. The RAM 302 is a RAM that functions as a main memory and work area or the like of the CPU 301. And the output information that is stored in the page memory 307 is printed onto a recording medium by a printer engine 308. A scanner unit 306 reads originals and performs storage to the RAM 302 or the HDD 304.

A network communication control unit 305 carries out exchanges of various data with external devices via the LAN 105. Furthermore, a local communication control unit 310 carries out exchanges of various data with locally connected external devices. It should be noted that "locally connected" indicates that a connection is performed directly and not via the LAN 105, but a connection may be performed to the LAN 105 via a locally connected external device. An operation unit 309 includes a display panel and a keyboard, and enables information to be provided to an operator as well as input of instructions from the operator.

The image forming apparatus according to the present embodiment has a printer function of printing data received from outside using the printer engine 308. Furthermore, it has a copying function of printing data that has been read by the scanner unit 306 using the printer engine 308. Furthermore, it has a scanning function and an external transmission function of externally transmitting data that has been read by the scanner unit 306 as external transmission data. Furthermore, it also has a facsimile function that combines the printer function, the scanning function, and the external transmission function, and a data management function of saving and managing data in the HDD 304.

Figure 4:
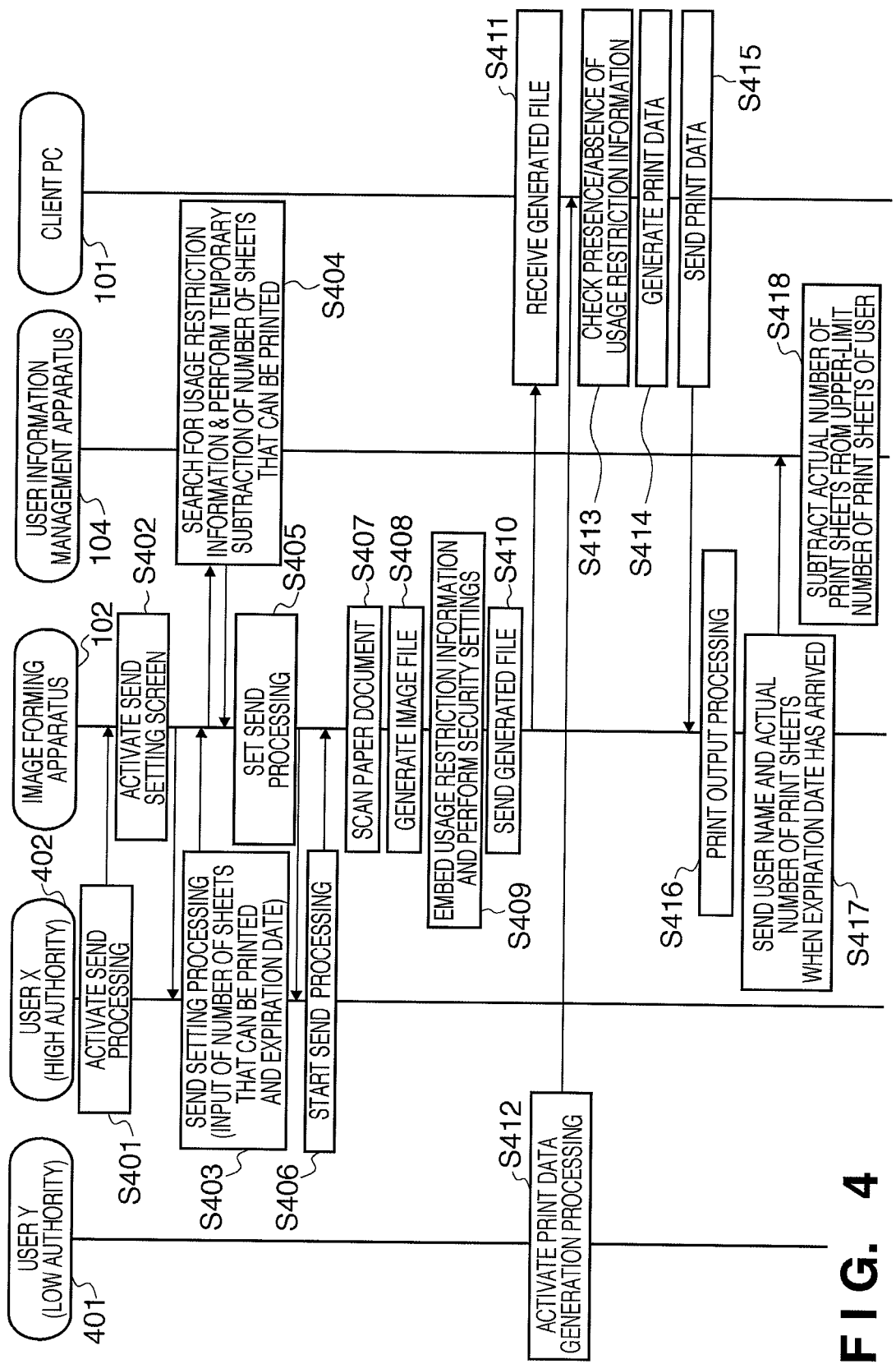
FIG. 4 is a diagram showing one example of an overall processing sequence in the image forming system according to the present embodiment.

Overall Processing Sequence Example in Image Forming System According to Present Embodiment FIG. 4 illustrates an overall processing sequence in an image forming system according to the present embodiment. In FIG. 4, description is given using the image forming apparatus 102 as a representative.

A user Y401 and a user X402 represent users who use the present image forming system, and correspond to user Y and user X in FIG. 9. The user X402 is a user having high authority in regard to usage restriction information relating to printing, and here has usage restriction information including permission for color printing, permission for single-sided printing, and 1-up printing (1 page per sheet→2-up printing or higher also permitted). On the other hand, the user Y401 is a user having low authority in regard to usage restriction information relating to printing, and here has usage restriction information including no permission for color printing (monochrome printing only), no permission for single-sided printing (double-sided printing only), and 2-up printing (2 pages per sheet→1-up printing not permitted). It should be noted that to use the present processing sequence, it is given that the user X402 has received in advance user authentication by the user information management apparatus 104 via the image forming apparatus 102, and that the image forming apparatus 102 is capable of being used. In the present embodiment, various techniques can be employed as specific procedures of user authentication, and therefore detailed description thereof is omitted.

SEND Processing Preparation

First, in a sequence S401, the user X402, who is a first operator, gives instruction to the image forming apparatus 102, which is an information processing apparatus that generates job data, to activate SEND processing. The image forming apparatus 102 that has been given instruction for SEND processing in sequence S401 activates a SEND processing setting screen (unshown) in sequence S402. The processing here includes details relating to reading resources of the setting screen and configuring of screen information. It should be noted that screen information includes a screen for inputting a number of sheets that can be printed of a SEND document and a screen for inputting an expiration date of usage restriction information.

In the SEND processing setting screen that is generated and displayed in sequence S402, the user X402 inputs a number of sheets that can be printed of a SEND document and an expiration date of usage restriction information in sequence S402. The image forming apparatus 102 makes a request to the user information management apparatus 104 for transmission of usage restriction information of the user X402 who activated the process of sequence S402. In sequence S404, the user information management apparatus 104 searches for usage restriction information corresponding to the specified user, obtains the usage restriction information, and transmits this to the image forming apparatus 102.

It should be noted that in obtaining usage restriction information in the process of sequence S404, temporary processing is executed as follows in regard to the number of print sheets. That is, temporary subtraction processing is performed in regard to the number of printable sheets inputted in sequence S403 from the upper-limit number of print sheets (see numeral 905 in FIG. 9) of the user specified in sequence S404 of the user information management database managed by the user information management apparatus 104. Here, "temporary subtraction processing" refers to a technique of temporarily locking the number of print sheets specified as the number of print sheets that can be printed from the upper-limit number of print sheets. For example, in a case where the number of print sheets that can be printed is 10 sheets and the upper-limit number of print sheets of the user is 100 sheets, then 10 sheets are temporarily locked and the upper-limit number of print sheets is set to 90 sheets.

In sequence S405, the image forming apparatus 102 uses the usage restriction information obtained in sequence S404 to reflect this restriction information in the setting screen. The image forming apparatus 102, which has finished processing up to sequence S405, displays the SEND processing setting screen on the operation unit 309, thereby providing an operable state to the user X402.

Next, in sequence S406, the user X402 uses the displayed SEND processing setting screen to carry out settings of SEND processing such as destination settings and function settings within a range of the usage restriction information of the user X402. Once the SEND settings are finished, the user X402 notifies the image forming apparatus 102 in sequence S406 of commencement of SEND processing.

Execution of SEND Processing

The image forming apparatus 102, which has received notification of commencement of SEND processing, successively carries out the following processing.

First, in sequence S407, image information of an original is read by the scanner unit 306. The image information that is read is stored in the RAM 302 or the HDD 304 shown in FIG. 3. Next, in sequence S408, an image file is generated from the image information that has been read in sequence S407 in accordance with the content of the settings that have been set at the SEND processing setting screen. Here, it is given that an original containing a color image is read and that a color image file is generated. The image file that has undergone file generation is stored in the RAM 302 or the HDD 304 shown in FIG. 3 in a same manner as the foregoing image information.

Next, in sequence S408, usage restriction information of the user X402 obtained at the sequence S404 and information of the number of print sheets that can be printed and the expiration date obtained in sequence S402 are embedded in an extension region of the image file generated in sequence S408. Further still, in sequence S409, security information for restraining printing of the image file is set in a standard region of the image file that has been generated in sequence S408. It should be noted that a format of the image file generated in sequence S408 is assumed to be a format such as the following, but there is no limitation to this. For example, this is a file format such as PDF (portable document format) or XPS (XML paper specification), which support security information relating to print settings such as print restraint as standard formats.

Next, in sequence S410, a process is carried out of sending the file (job data) stored in the RAM 302 or the HDD 304 shown in FIG. 3 in accordance with a protocol specified with respect to a destination that has been set in the SEND processing setting screen. Here, the client PC 101, which is the destination, carries out reception of the file in sequence S411 using the specified protocol.

The foregoing has been description of a processing sequence of SEND processing portions relating to the present embodiment.

Print Data Generation Process

Following from above, next description is given regarding a processing sequence of a print data generation process relating to the present embodiment.

First, in sequence S412, the user Y401, who is a second operator, uses the client PC 101, which is a job processing apparatus that executes jobs in accordance with job data, to activate a print data generation process. Specifically, it uses application software that processes the received image file to open the image file, and activates a printer driver for executing printing in the image forming apparatus 102 from a print menu of the application software.

In sequence S413, the client PC 101, which has received an instruction for activation of the print data generation process, checks whether or not usage restriction information is embedded in the job data (the received image file) to be printed. In a case where there is usage restriction information, it checks the expiration date and if this is within the expiration date, it clears the print restraint setting of the security information of the data to be printed. If it is not within the expiration date, printing is canceled due to the print restraint setting. Next, in sequence S414, it generates print data in accordance with the usage restriction information and in sequence S415 it sends the print data to the image forming apparatus 102 as an output destination. Here, the usage restriction information of the user X402 is contained in the image file, and therefore specifications of color printing, single-sided printing, and 1-up printing are possible. Of course, without specifying these, any less restricted setting such as monochrome printing, double-sided printing, and 2-up printing is possible if instructed by the user. Print data of a page description language interpretable by the image forming apparatus 102 and including these sets of specified information is generated and output. On the other hand, in a case where usage restriction information of the user X402 has not been included in the data to be printed, only print data within the range of the usage restriction information of the user Y401 is permitted to be generated. That is, even if a function is usable by the printer driver itself that is activated on the client PC 101, usage is restricted in accordance with the usage restriction information.

Example Configuration of Print Data

FIG. 8 shows one example of print data that has been generated by a print data generation process of the client PC 101.

The print data includes printing restriction information 801 and print data body (image data) 802.

The printing restriction information 801 includes a header 801a for specifying that this is print data, and a print output device name 801b for specifying the image forming apparatus 102. Also included are a user name 801c, a color print capability flag 801d, a single-sided print capability flag 801e, and N-up print information 801f (see FIG. 9), which correspond to the printing restriction information of the user X402 who instructed SEND processing. Further still, a number 801g of print sheets and an expiration date 801i inputted by the user X402 in the SEND processing settings are included.

Print Output Processing

In sequence S416, the image forming apparatus 102, which is the job processing apparatus that has received the print data, checks whether or not there is usage restriction information in the print data. Then, in a case where there is usage restriction information, it checks the expiration date, and if the present date is within the expiration date, print output processing is carried out in accordance with the usage restriction information, then processing finishes. On the other hand, if it is not within the expiration date, print output processing is canceled. Here, the image forming apparatus that executes printing may be the same as the sending device and may be another image forming apparatus. Here, even if the user Y401, who instructed printing, is not permitted to perform printing in color, printing in color is permitted by the authority of the user X402. The same applies in regard to other print settings. It should be noted that job processing up to generating print data is carried out by the client PC 101, and the execution of the print job is carried out by the image forming apparatus 102. Next, in sequence S417, when the expiration date of the usage restriction information has arrived, the image forming apparatus 102 sends the user name and the actual number of print sheets described in the usage restriction information to the user information management apparatus 104.

In sequence S418, the user information management apparatus 104, which has received the user name and the actual number of print sheets, searches the user information management database with the user name as a key, and executes a subtraction finalizing processing in regard to the actual number of print sheets from the upper-limit number of print sheets corresponding to the user name (see FIG. 9). Here, "subtraction finalizing processing" refers to a technique of canceling a temporary lock (the foregoing temporary subtraction) on the number of print sheets specified as the number of print sheets from the upper-limit number of print sheets and carrying out subtraction processing of the actual number of print sheets, and finalizing subtraction processing. For example, suppose that there is a case where the actual number of print sheets is eight sheets in a situation where 10 sheets are being temporarily locked by the temporary subtraction processing. This indicates a process in which the lock on the 10 sheets that are temporarily locked is canceled, that is, the unlocked 10 sheets are added to the upper-limit number of print sheets, then only the eight sheets of the actual number of print sheets is subtracted from the upper-limit number of print sheets.

It should be noted that with the present embodiment, in addition to achieving printing in which restrictions are temporarily reduced by using usage restriction information of a user for a specified document received from that user in a system in which usage of image forming apparatuses is restricted according to users, effects such as the following are also achieved. For example, with the processing of sequence S418, it is possible to increase the reliability of printing regulation by performing a process of subtracting only the number of sheets actually printed from the upper limit number in a system that restricts usage of an image forming apparatus according to users. Moreover, it is possible to prevent printing of more than the upper limit number being inadvertently permitted. Furthermore, by checking in sequence S413 the expiration date of usage restriction information inputted by the user X in sequence S402, it is possible to increase security in such ways as preventing improper sharing of usage restriction information. Further still, with the present processing sequences, it is possible to execute printing in which restriction is temporarily reduced by using usage restriction information of another user for a specified document received by SEND processing or the like in a system that restricts usage of the image forming apparatuses, without carrying out a process in advance such as pre-approval processing. It should be noted that reducing restrictions indicates that for items whose usage is restricted for a number of recording sheets or recording agent to be used in one time of print processing (double-sided printing, N-up printing other than 1-up, and monochrome printing), the restriction thereof is canceled (thereby permitting single-sided printing, 1-up printing, and color printing). Furthermore, canceling restriction includes that the counting of number of print sheets executed is set with respect to the sender of the document rather than a user who has executed printing.

Figure 5:
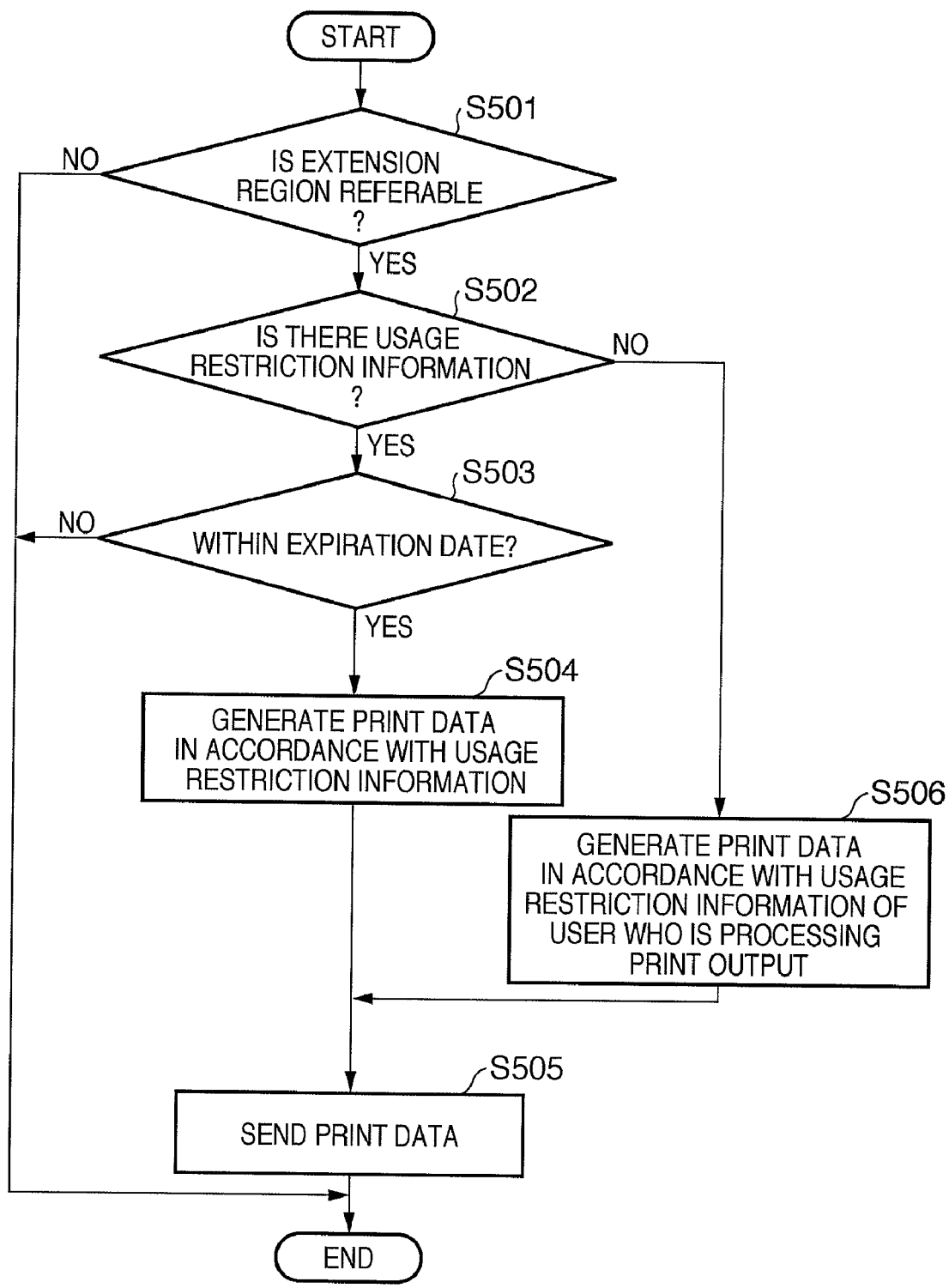
FIG. 5 is a flowchart showing one example of a processing operation of a client PC.

Example Processing Procedure in Image Forming System According to Present Embodiment Example Procedure of Operating Client PC FIG. 5 is a flowchart showing an operation of the client PC 101 relating to the present embodiment. The present operation corresponds to sequences S413 to S415 in the sequence diagram of FIG. 4, and is controlled by executing a program that has been developed into the RAM 202 by being read from the hard disk 212 or the like by the CPU 201 of the client PC 101.

A program of the present flow commences when a request is received from the user by the CPU 201 of the client PC 101 to activate print data generation processing. First, in step S501, the CPU 201 determines whether or not an extension region of a data file to be printed can be referenced, and when it can be referenced, the procedure proceeds to step S502. In a case where it cannot be referenced, the CPU 201 finishes the process.

Next, in step S502, in a case where the CPU 201 has referenced an extension region of the data file to be printed and there is usage restriction information, the procedure proceeds to step S503, and in cases other than this, the procedure proceeds to step S506. Next, the CPU 201 checks the expiration date of the usage restriction information in step S503, and if the present date is within the expiration date, the procedure proceeds to step S504. On the other hand, if it is not within the expiration date, the CPU 201 cancels the generation and sending of print data.

In step S504, the CPU 201 generates print data in accordance with the usage restriction information. For example, in a case where the usage restriction information permits color printing, permits single-sided printing, the N-up print information is for 1-up printing, and ten sheets, then the user is allowed to freely carry out print settings within the range of color printing being permitted, single-sided printing being permitted, 1-up printing, and ten sheets, and print data is generated with these settings. Then the CPU 201 proceeds to step S505.

On the other hand, in step S506, the CPU 201 obtains usage restriction information of the user who is processing print output from the user information management apparatus 104 or the like and generates print data in accordance with this usage restriction information. For example, in a case where the usage restriction information does not permit color printing (only monochrome printing), does not permit single-sided printing (only double-sided printing), the N-up print information is for 2-up printing, and five sheets, then the user is allowed to freely carry out print settings within the range of the settings of monochrome printing, 2-up printing, and five sheets. Then the CPU 201 generates print data with these settings and proceeds to step S505.

In step S505, the CPU 201 sends the print data that has been generated in step S504 or step S506 to the image forming apparatus and processing finishes.

Example Operational Procedure of Image Forming Apparatus

FIGS. 6A to 6D are flowcharts showing operations of the image forming apparatus 102 or 103 relating to the present embodiment. The present operation is controlled by executing a program that has been developed into the RAM 302 by being read from the ROM 303 or hard disk 304 or the like by the CPU 301 in the image forming apparatus 102 or 103.

Figure 6A:
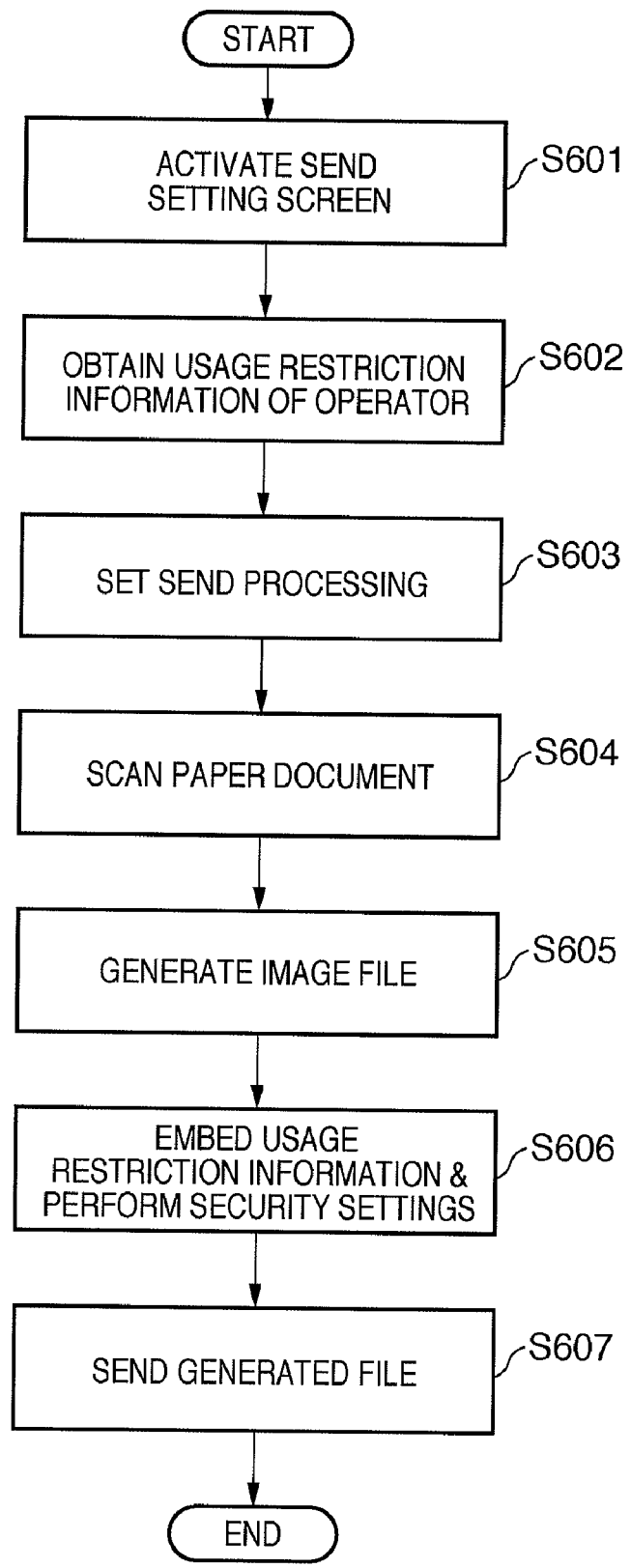
FIG. 6A is a flowchart showing one example of a SEND processing operation of the image forming apparatus.

First, in accordance with the flowchart of FIG. 6A, a procedural example from the functions of SEND processing to the sending of the generated file by the image forming apparatus is shown, which corresponds to the sequences S402, S405, and S407 to S410 in the sequence diagram of FIG. 4.

A program of the present flow commences when a request is received by the CPU 301 of the image forming apparatus 102 or 103 to activate SEND processing.

First, in step S601, the CPU 301 activates the SEND setting screen. The SEND setting screen includes a screen for inputting the number of print sheets that can be printed and the expiration date of the usage restriction information. Next, in step S602, the CPU 301 obtains the usage restriction information of the operator from the user information management apparatus 104 or the like. Next, in step S603, the CPU 301 uses the usage restriction information to reflect restriction information on the setting screen and displays this on the operation unit 309. Once the user has finished settings of SEND processing such as specifying the reading mode of the original and inputting of the destination via the operation unit 309, notification is given to the CPU 301 of the image forming apparatus of commencement of SEND processing.

Once the CPU 301 receives notification of commencement of SEND processing via the operation unit 309, the procedure proceeds to step S604. In step S604, the CPU 301 executes reading of image information of the original using the scanner unit 306 in accordance with the reading mode that has been specified. The image information that is read is stored in the RAM 302 or the HDD 304. Next, in step S605, the CPU 301 generates an image file from the image information that has been read in step S604 in accordance with the content of the settings that have been set at the SEND processing setting screen. The CPU 301 stores the image file that has undergone file generation in the RAM 302 or the HDD 304 shown in FIG. 3 in a same manner as the foregoing image information.

Next, in sequence S606, the CPU 301 embeds usage restriction information of the operator obtained at the step S602 and information of the number of print sheets that can be printed and the expiration date obtained in step S601 in the extension region of the image file generated in step S605. Further still, in step S606, the CPU 301 sets security information for restraining printing of the image file in a standard region of the image file that has been generated in step S605. Furthermore, the CPU 301 adds information prohibiting duplication to the print data that has been generated in this manner, such that duplication is prohibited at the device receiving this file. Furthermore, it is also possible to add information so that a print instruction cannot be performed except by the users specified here as the destination. Next, in step S607, the CPU 301 carries out a process of sending the file stored in the RAM 302 or the HDD 304 shown in FIG. 3 in accordance with a protocol specified with respect to the destination that has been set in step S603, and processing finishes.

Figure 6B:
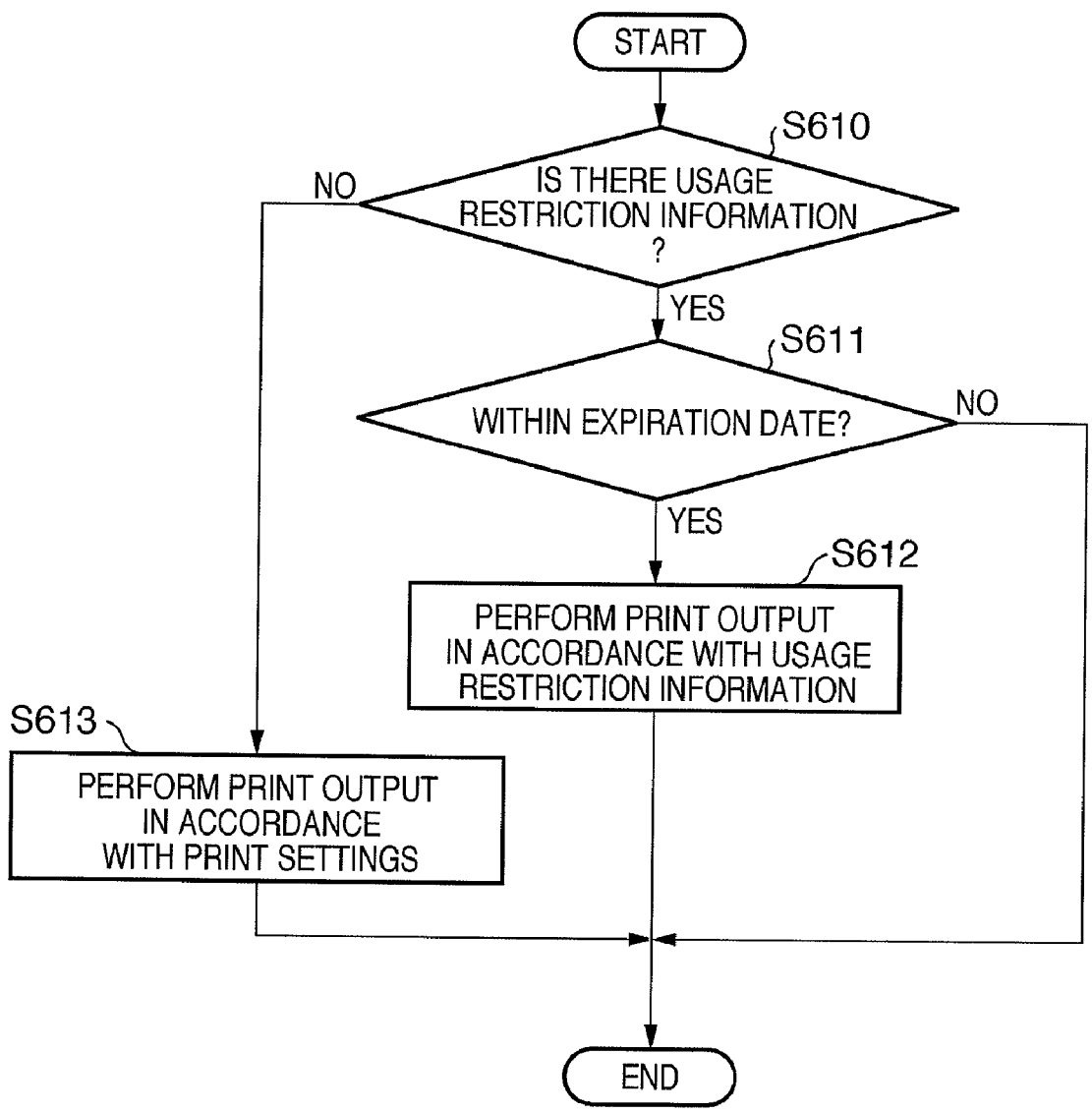
FIG. 6B is a flowchart showing one example of a print output operation of the image forming apparatus.

Next, in accordance with the flowchart of FIG. 6B, a procedural example of print output processing by the image forming apparatus is shown, which corresponds to the sequence S416 in the sequence diagram of FIG. 4.

A program of the present flow commences when the CPU 301 of the image forming apparatus 102 or 103 accepts a request to receive print data via the network communication control unit 305.

First, in step S610, the CPU 301 of the image forming apparatus that has received the print data checks whether or not there is usage restriction information in the received print data, and in a case where it is determined that there is usage restriction information, the procedure proceeds to step S611. Next, in step S611, the CPU 301 checks the expiration date in a case where there is usage restriction information, and when the current time is within the expiration date, the procedure proceeds to step S612. In step S612, the CPU 301 carries out print output processing in accordance with the usage restriction information. If it is not within the expiration date, print output processing is canceled.

When it is determined in step S610 that there is no usage restriction information, the CPU 301 proceeds to step S613. Next, in step S613, the CPU 301 carries out printing in accordance with the print settings that have been set in the print data. Furthermore, in a case where the current time is not within the expiration date in step S611, the CPU 301 discards the print data and cancels print output, then finishes processing.

Further still, in accordance with the flowchart of FIG. 6C, description is given of an operational procedure after print output processing by the image forming apparatus in sequence S416 in the sequence diagram of FIG. 4.

A program of the present flow commences when the CPU 301 of the image forming apparatus 102 receives notification of completion of print output processing.

In step S631, the CPU 301 writes the actual number of print sheets of the print data for which print output processing has been completed into the usage restriction information corresponding to that print data, then proceeds to step S632. In step S632, the CPU 301 sets the usage restriction information and the expiration date corresponding to the usage restriction information, then stores this in the RAM 302 or the HDD 304, and processing finishes.

Finally, in accordance with the flowchart of FIG. 6D, description is given of an operational procedure after the expiration date of the usage restriction information by the image forming apparatus, which corresponds to sequence S417 in the sequence diagram of FIG. 4.

After print output processing is completed, the CPU 301 of the image forming apparatus sets the usage restriction information and the expiration date of the usage restriction information, and stores this in the RAM 302 or the HDD 304. The present operational procedure indicates a process of an application or a service that regularly monitors the expiration date of the usage restriction information that has been stored.

First, a program of the present flow commences when a request is received by the CPU 301 of the image forming apparatus 102 to activate an application that regularly monitors expiration dates.

In step S621, the CPU 301 checks whether or not the expiration date of the stored usage restriction information has arrived. If there is usage restriction information for which the expiration date has arrived, then the CPU 301 proceeds to step S622. In step S622, the CPU 301 sends the user name and the actual number of print sheets described in the usage restriction information to the user information management apparatus 104 and the procedure proceeds to step S623. In step S623, the CPU 301 discards usage restriction information for which the expiration date has expired, and processing finishes.

In a case where there is no usage restriction information for which the expiration date has arrived in step S621, the CPU 301 finishes processing.

Example Operational Procedure of User Information Management Apparatus

Figure 7A:
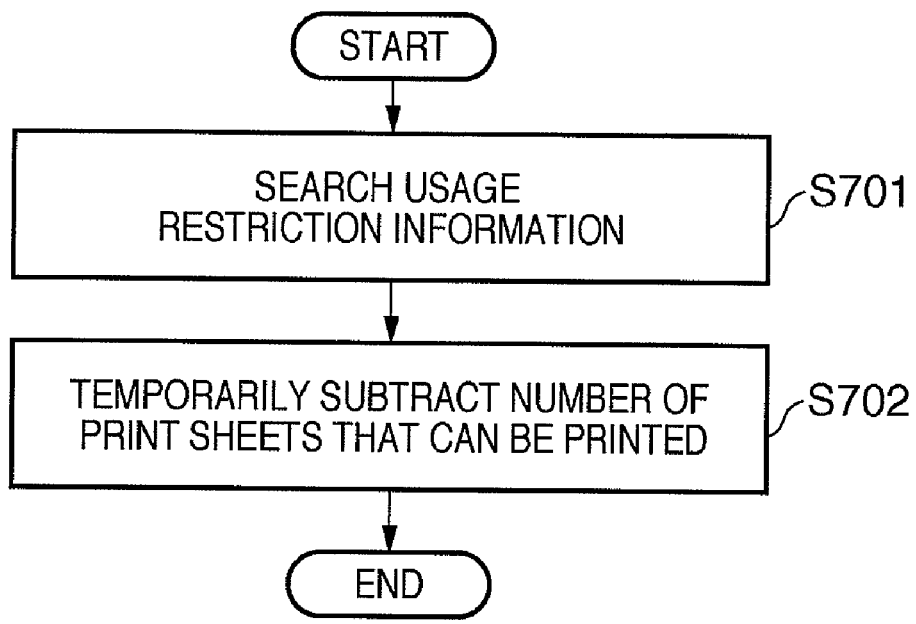
FIG. 7A is a flowchart showing one example of temporary subtraction processing of a number of print sheets in a user information management apparatus.
Figure 7B:
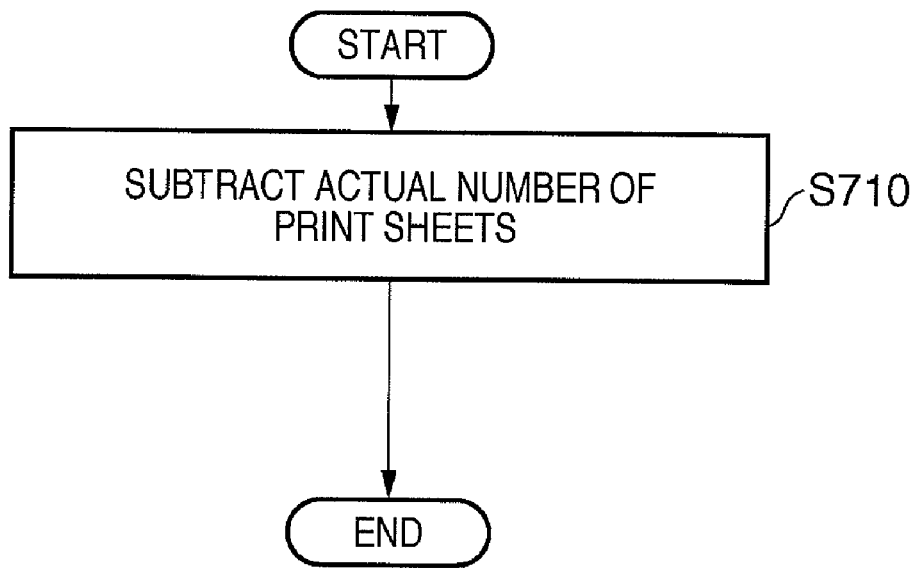
FIG. 7B is a flowchart showing one example of actual subtraction processing of a number of print sheets in the user information management apparatus.

FIG. 7A and FIG. 7B are flowcharts showing example operational procedures of the user information management apparatus 104 relating to the present embodiment. The present operation is controlled by executing a program that has been developed into the RAM 202 by being read from the hard disk 212 or the like by the CPU 201 in the user information management apparatus 104.

First, in accordance with the flowchart of FIG. 7A, description is given of an example procedure of temporary subtraction processing of the number of print sheets of the user information management apparatus 104, which corresponds to the sequence S404 in the sequence diagram of FIG. 4.

In step S701, the CPU 201 searches for usage restriction information of a relevant user from the database of the user information management apparatus 104 with the user name described in the packet of the received usage restriction information search request as a key, then proceeds to step S702. In step S702, the CPU 201 temporarily subtracts the number of print sheets that can be printed, which is described in the packet of the received usage restriction information search request, from the upper-limit number of print sheets in the usage restriction information found in step S701, then processing finishes.

Next, in accordance with the flowchart of FIG. 7B, description is given of an example procedure of actual subtraction processing of the number of print sheets of the user information management apparatus 104, which corresponds to the sequence S418 in the sequence diagram of FIG. 4.

A program of the present flow commences when a request is received by the CPU 201 of the user information management apparatus 104 for subtraction of the actual number of print sheets from the image forming apparatus 102.

In step S710, the CPU 201 references the user name and the actual number of print sheets, which are described in the packet of the received actual number of print sheets subtraction request, and searches for usage restriction information with the user name as a key. Then, the CPU 201 subtracts the actual number of print sheets, which is described in the packet of the actual number of print sheets subtraction request of which notification has been given from the upper-limit number of print sheets in the usage restriction information, then processing finishes.

Other Embodiments

In the foregoing embodiments, description was given that the user information management apparatus and the image forming apparatus were separate apparatuses, but all or a portion of the functions of the user information management apparatus may be conferred to the image forming apparatus that carries out printing of the images. In this case, the image forming apparatus that sends the print data obtains usage restriction information that is saved in its own HDD 304 and adds the usage restriction information to the print data. When the client PC that receives this sends print data to the image forming apparatus, the image forming apparatus that receives this compares this with the usage restriction information saved in its own HDD 304, and executes printing if printing is permitted under the print settings contained in the print data. In this case, the image forming apparatus permitted to execute printing is limited, and the number of print sheets (upper-limit number) is managed by only a single image forming apparatus.

Furthermore, only user information and information that permits usage of the usage restriction information of the relevant user is added as usage restriction information without adding specific settings of permission to the print data. And based on this it is also possible to obtain information that can be set by this user on the client PC that generates the job data. Furthermore, it is also possible that the job processing apparatus determines the usage restriction information based on the user information contained in the received job data among setting information contained in the received job data, and executes the job within a range permitted by the settings.

Furthermore, in the foregoing description, the image forming apparatus, which is the sending apparatus, generates print data according to a scan of originals. However, there is no limitation to this, and print data may be generated using application software on an apparatus such as the client PC, which may further add usage restriction information.

Furthermore, in addition to a print instruction from a print menu of application software, the processing of the client PC in the foregoing embodiments may achieve equivalent effects in a following manner. For example, there are cases such as a hot folder (monitored folder) in which a script of prescribed print settings is activated when print data is dropped into the folder, and a form of pull printing in which print data from a Web browser or the like is specified and print insertion is performed. In cases such as these also, when there is usage restriction information in the inserted print data, processing is carried out in accordance with that usage restriction information, and therefore an equivalent effect is achieved as the foregoing embodiments. That is, print settings associated with the folder are registered for a hot folder, but in a case where the print data dropped into the folder contains usage restriction information of the document creator as described earlier, it is possible to display a message to that effect and give notification indicating that the print settings can be changed. In this way, printing is enabled for a user under print settings that exceed usage restrictions of that user. In a case where printing is specified from a Web browser, forms of printing are available with a following method. In a case where the image forming apparatus 102 is provided with a Web server function, the client PC may use the Web browser and carry out various instructions to the image forming apparatus 102. Using this function, printing instructions are carried out by specifying from the client PC a path (address) of a file stored in a storage device on a network. Then, the image forming apparatus 102 obtains the file from the specified path and executes printing. At this time, in a case where usage restriction information is contained in the obtained file, the image forming apparatus 102 can carry out printing in a similar manner with print settings that exceed the usage restrictions of the user who has instructed printing by giving notification to that effect to the client PC.

Furthermore, in the foregoing description, description was given using an example of print processing by an image forming apparatus as a job processing apparatus, but the present invention is applicable to types of jobs other than printing. For example, it can be applied in cases such as executing jobs by temporarily reducing usage restrictions relating to sending processes for send jobs such as email of received data.

Furthermore, the present invention may be applied to a system or an integrated apparatus constituted by a plurality of devices (for example, a host computer, an interface device, and a printer or the like), and may be applied to an apparatus constituted by a single device.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-316272 filed Dec. 11, 2008, which is hereby incorporated by reference herein in its entirety.

What is claimed is:

1. A job processing system including a job processing apparatus for executing a job, and an information processing apparatus having a job data generation function and capable of communicating with said job processing apparatus, which are connected to a network, said system comprising:
   a management unit configured to manage usage restriction information to restrict user usage of functions in said job processing apparatus;
   a writing unit in said information processing apparatus, configured to acquire from said management unit usage restriction information corresponding to a first operator instructing generation of job data using the job data generation function, and writing, by the job data generation function, the acquired usage restriction information into the job data to be transmitted to said job processing apparatus;
   a checking unit in said job processing apparatus, configured to check whether or not the usage restriction information is written in the job data received from said information processing apparatus; and
   a job processing unit in said job processing apparatus, configured to process the job data in accordance with the written usage restriction information when said checking unit recognizes that the usage restriction information is written in the job data, and when said checking unit can not recognize that the usage restriction information is written in the job data, to acquire from said management unit usage restriction information of a second operator instructing execution of a job based on job data in said job processing apparatus, and process the job data in accordance with the acquired usage restriction information.

2. The job processing system according to claim 1, further comprising an image forming apparatus that carries out print processing based on inputted job data,
   wherein said job processing apparatus processes the job data for causing print processing to be carried out in said image forming apparatus using said job processing unit.

3. The job processing system according to claim 2, further comprising a print control unit in said image forming apparatus configured to check whether or not there is usage restriction information in the job data in a case where a print output function of said image forming apparatus is to be used, and to perform a print output processing in accordance with the usage restriction information in a case where there is usage restriction information in the job data, and perform a print output processing in accordance with print setting contained in the job data in a case where there is no usage restriction information in the job data.

4. The job processing system according to claim 2, wherein said management unit manages a number of print sheets for each user, and
   said job processing system further comprises a reflection unit configured to reflect an actual number of print sheets of a user described in usage restriction information of job data by said image forming apparatus into a number of print sheets of said management unit.

5. The job processing system according to claim 1, wherein said writing unit writes usage restriction information of a first operator together with an expiration date of the usage restriction information into the job data, and
   said job processing unit checks the expiration date of the usage restriction information in a case where there is usage restriction information in the job data, and carries out processing of the job data if it is within the expiration date, and cancels processing of the job data if it is not within the expiration date.

6. The job processing system according to claim 1, wherein said management unit is included in a user information management apparatus that is connected via a network to said job processing apparatus and said information processing apparatus.

7. A job processing apparatus in a job processing system including the job processing apparatus for executing a job, and an information processing apparatus having a job data generation function and capable of communicating with said job processing apparatus, which are connected to a network, said job processing apparatus comprising:
   a checking unit configured to check whether or not usage restriction information corresponding to a first operator instructing generation of job data using the job data generation function is written in the job data received from said information processing apparatus; and
   a job processing unit configured to process the job data in accordance with the written usage restriction information when said checking unit recognizes that the usage restriction information is written in the job data, and when said checking unit can not recognize that the usage restriction information is written in the job data, to acquire usage restriction information of a second operator instructing execution of a job based on job data in said job processing apparatus from a management unit that manages usage restriction information for restricting usage of functions of said job processing apparatus for each user, and process the job data in accordance with the acquired usage restriction information.

8. A method of controlling a job processing apparatus in a job processing system comprising said job processing apparatus for executing a job, and an information processing apparatus having a job data generation function and capable of communicating with said job processing apparatus, which are connected to a network, said method comprising the steps of:
   checking whether or not usage restriction information corresponding to a first operator who has instructed generation of job data using the job data generation function is written in the job data received from said information processing apparatus;
   processing the job data in accordance with the written usage restriction information when it is recognized in said checking step that the usage restriction information is written in the job data; and acquiring usage restriction information of a second operator instructing execution of a job based on job data in said job processing apparatus from a management unit that manages usage restriction information for restricting usage of functions of said job processing apparatus for each user, and processing the job data in accordance with the acquired usage restriction information, when it is not recognized in said checking step that the usage restriction information is written in the job data.

9. A non-transitory computer-readable storage medium which stores a program for causing a computer to execute steps of a method of controlling a job processing apparatus according to claim 8.

* * * * *